United States Patent [19]

Hanson et al.

[11] Patent Number: 5,633,861
[45] Date of Patent: May 27, 1997

[54] TRAFFIC MANAGEMENT AND CONGESTION CONTROL FOR PACKET-BASED NETWORKS

[75] Inventors: Raymond H. Hanson, Reston, Va.; Albert Lespagnol, Montigne Le Bretonneux, France; Tony Y. Mazraani, Fairfax, Va.; Barton J. Milburn, Haymarket, Va.; Jonathan B. R. White, Reston, Va.; Srinivas C. Dabir, Chantilly, Va.

[73] Assignee: Alcatel Data Networks Inc., Ashburn, Va.

[21] Appl. No.: 585,265

[22] Filed: Jan. 11, 1996

Related U.S. Application Data

[63] Continuation of Ser. No. 358,741, Dec. 19, 1994, abandoned.

[51] Int. Cl.$^6$ .............................. H04J 3/14; H04L 12/56
[52] U.S. Cl. ........................................... 370/232; 370/412
[58] Field of Search ................................ 370/13, 17, 60, 370/60.1, 79, 84, 94.1, 94.2, 94.3, 110.1

[56] References Cited

U.S. PATENT DOCUMENTS

| | | | |
|---|---|---|---|
| 5,018,137 | 5/1991 | Backes et al. | 370/85.13 |
| 5,029,164 | 7/1991 | Goldstein et al. | 370/95.1 |
| 5,167,033 | 11/1992 | Bryant et al. | 395/575 |
| 5,193,151 | 3/1993 | Jain | 395/200 |
| 5,280,470 | 1/1994 | Buhrke et al. | 370/13 |
| 5,313,454 | 5/1994 | Bustini et al. | 370/13 |
| 5,339,313 | 8/1994 | Ben-Michael et al. | 370/85.13 |
| 5,359,593 | 10/1994 | Derby et al. | 370/17 |
| 5,377,327 | 12/1994 | Jain et al. | 395/200 |
| 5,381,404 | 1/1995 | Sugano et al. | 370/13 |
| 5,390,173 | 2/1995 | Spinney et al. | 370/60 |
| 5,390,299 | 2/1995 | Rege et al. | 395/250 |
| 5,414,697 | 5/1995 | Osaki | 370/17 |
| 5,426,635 | 6/1995 | Mitra et al. | 370/60 |
| 5,457,687 | 10/1995 | Newman | 370/85.3 |

FOREIGN PATENT DOCUMENTS 9320637  10/1993  WIPO.

OTHER PUBLICATIONS

"Credit–Based FCVC Proposal for ATM Traffic Management (Revision R1)" pp. 1–30, Virtual Harvard Educ.
"Closed–Loop–Rate–Based Traffic Management", pp. 1–12 and 1–7, ATM Forum, Document No. ATM Forum/94 0438.
P. Crocetti et al., "Bandwidth Advertising for Man/ATM Connectionless Internetting" Published 1991 by: International Teletraffic Congress 7th Specialist Seminar (Oct. 1990).
P. Crocetti et al., "Internetworking of MANs and ATM".

Primary Examiner—Hassan Kizou
Attorney, Agent, or Firm—Ware, Fressola, Van Der Sluys & Adolphson

[57] ABSTRACT

In a packet-based communications network (100), a virtual connection is established between a source node (102a) and a destination node (102b), which may traverse one or more intermediate nodes (105). During the flow of packets along the virtual connection in a forward direction, from the source node (102a) to the destination node (102b), each node measures the utilization of critical resources (CUF), and this utilization information is inserted into return packets flowing in the backward (return) direction, from the destination node (102b) to the source node (102b). CUF is indicative of the maximum utilization of any resource in the virtual connection forward path. If the network utilization information indicates that the resources of a virtual connection are under-utilized, the submission rate (SIR) of packets onto the virtual connection is increased. However, if the network utilization information indicates that the resources of the virtual connection are over-utilized, the submission rate of packets onto the network at the source node is reduced.

46 Claims, 5 Drawing Sheets

TRAFFIC MANAGEMENT AND CONGESTION CONTROL FOR PACKET-BASED NETWORKS

This application is a continuation of application(s) Ser. No. 08/358,741 filed on Dec. 19, 1994, now abandoned.

TECHNICAL FIELD

The present invention relates to packet-based networks, and more particularly, to traffic management and congestion control for packet-based networks.

BACKGROUND OF THE INVENTION

A packet-based communications network provides for the transmission of packets between various nodes in the communications network. A "packet" comprises any fixed or variable size grouping of bits. Examples of packet-based networks include: frame relay networks wherein a packet corresponds to a frame relay frame; a cell-switching network, e.g., an asynchronous transfer mode (ATM) network, wherein a packet corresponds to an ATM cell; etc. A node may be defined as a termination point for two or more channels or lines, and it typically includes control equipment.

Within in a packet-based communications network, a virtual connection (VC) is established between a source node and a destination node, and usually traverses one or more intermediate nodes. A virtual connection is a logical connection (channel) between the source node and the destination node for the transmission of packets therebetween. Each node in the virtual connection acts as a packet exchanger for receiving and forwarding a packet to its destination node. Each node within the communications network may be part of a variety of virtual connections. Terminal nodes, such as the source node and the destination node, have the necessary interface cards for receiving preformatted packets, and/or properly formatting data contained in a standard user data stream into packets, and/or for reassembling packets into the standard user data streams.

Packet-based communication networks are able to integrate a variety of data such as local area network data, voice data, and image/video data into packets for transmission over high-speed digital trunks. Each source node and destination node is interconnected to various customer premises equipment (CPE) such as a local area network, fax/modem equipment, voice equipment, and image/video equipment and other data and/or packet equipment for transmission of corresponding packets via the communications network to a destination node.

In such packet-based networks, it is important to provide appropriate protocols for traffic management and congestion control of packets traveling via a virtual connection. Various methods have been developed to control the rate of packet transmission onto a virtual connection and also control the selective discarding of packets for packet management and congestion control.

One approach to packet management and congestion control is a credit based approach. The credit based approach is a protocol which acts between adjacent nodes, identified as a transmitter and a receiver, wherein a packet is not transmitted from a transmitter to a receiver unless the sender knows that the receiver can accept the information without loss. The receiver sends control information to the transmitter indicating that it is able to accept new packets. The credit based approach does not rely on end-to-end signals to respond to congestion. In such a credit based approach, closed loop control of the transmitter is utilized so that data is sent as fast as possible, with no loss of data, from the transmitter to the receiver.

Another congestion management approach is a feedback approach wherein the congestion state of the virtual connection is measured as packets flow in a forward direction from the source node to the destination node, and the measurement of the congestion state is sent back from the destination node to the source node for adjusting the submission of packets onto the network.

SUMMARY OF THE INVENTION

Objects of the invention include improved traffic management and congestion control of a packet-based communications network.

Another object of the present invention is a packet-based communications network wherein the data rate of a virtual connection is controlled on an end-to-end basis.

A further object of the present invention is traffic management of a packet-based communications network wherein utilization of network resources is maximized while over utilization of network resources is limited.

A still further object of the present invention is to provide a packet-based communications network having an initial packet submission rate which is selected to limit delays incurred by bursts in traffic while also minimizing congestion at convergence points of the network.

Another object of the present invention is to provide a packet-based communication network having a quick and fair allocation of resources among active virtual connections.

A still further object of the present invention is the timely provision of network utilization information to a source for adjustment of the rate of packet submission by the source, with the most timely utilization information being related to a critical or access node of a virtual connection.

According to the present invention, in a packet-based communications network, a virtual connection is established between a source node and a destination node, which may traverse one or more intermediate nodes; during the flow of packets along the virtual connection in a forward direction, from the source node to the destination node, each node measures the utilization of critical resources, and this utilization information is piggy-backed onto packets flowing in the backward (return) direction, from the destination node to the source node.

In further accord with the present invention, the utilization information provided to the source node is indicative of the maximum utilization of any resource in the virtual connection forward path.

In still further accord with the present invention, in the absence of packets flowing in the backward direction, the destination node generates special empty packets for transmission to the source node upon which the utilization information may be piggy-backed by the intermediate nodes.

According further to the present invention, if the network utilization information indicates that the resources of a virtual connection are under-utilized, the submission rate of packets onto the virtual connection is increased. However, if the network utilization information indicates that the resources of the virtual connection are over-utilized, the submission rate of packets onto the network at the source node is reduced.

According still further to the present invention, the period of time between two consecutive rate adjustments of the packet submission rate of packets onto a virtual connection is selected to allow the first adjustment to take effect throughout the network before the occurrence of the second adjustment.

According still further to the present invention, when a virtual connection becomes active, e.g., a source node begins transmission of packets onto the virtual connection, other active virtual connections reduce their use of excess network resources in favor of the newly active virtual connection, thereby allowing a quick and fair allocation of resources among active virtual connections. Additionally, when network utilization information indicates that a reduction in the rate of packets submitted onto the network is necessary, virtual connections with higher use of excess network resources incur higher packet submission rate reductions compared with virtual connections with lesser use of excess network resources.

In further accord with the present invention, bandwidth admission for a virtual connection is controlled in accordance with assigned service categories for the determination of whether or not packets are admitted to the network, and for the identification of packets that are admitted to the network with an assigned priority for determination of which packets will be discarded under certain congestion conditions.

In still further accord with the present invention, credits are associated with each service category such that various credits are assigned to a virtual connection per measurement period, T, for admission of packets to the network during the measurement period. Each packet is assigned a credit, and during extreme congestion conditions on the network, packets are discarded based on the priority of the corresponding assigned credit.

In further accord with the present invention, multiple classes of service may be designated which define the bandwidth admission, trunk queue and service discipline, and CUF measurement and SIR control for a given virtual connection.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

For purposes of simplifying the description of the present invention, number abbreviations are used in the following description. The following table of abbreviations is provided as a reference for the reader:

| ABBREVIATION | MEANING |
| --- | --- |
| ATM | Asynchronous Transfer Mode |
| CIR | Committed Information Rate |
| CMP | Congestion Monitoring Period |
| CPE | Customer Premises Equipment |
| CPU | Central Processing Unit |
| CUF | Channel Utilization Factor |
| EIR | Excess Information Rate |
| FF | Fairness Factor |
| ISR | Initial Submission Rate |
| PAD | Packet Assembler/Disassembler |
| RTD | Round Trip Delay |
| SIR | Submission Information Rate |
| VC | Virtual Connection |

Figure 1:
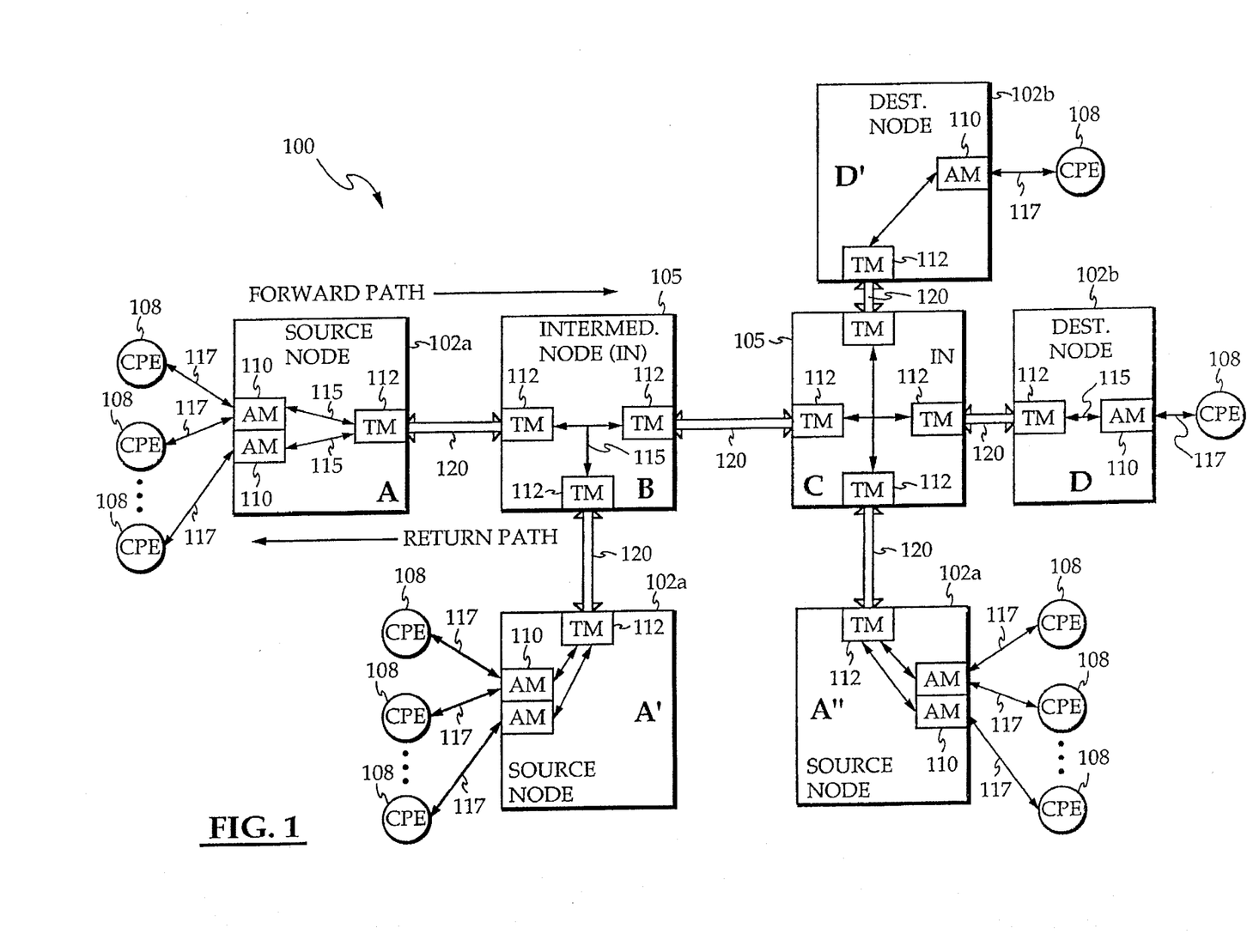
FIG. 1 is a schematic block diagram of a packet-based communications network.

Referring to FIG. 1, a packet-based communication network 100 comprises a plurality of nodes including terminal or switching nodes 102 and intermediate nodes 105. As is well known in the art, in a packet-based communications network, packets are transmitted on a virtual connection from a source node 102a to a destination node 102b, usually traversing one or more intermediate nodes 105. The source node 102a and the destination node 102b are switching nodes 102 which interface with customer premises equipment (CPE) 108. The customer premises equipment 108 may include a local area network, voice equipment, image and video equipment, or other data and packet transmission equipment which provides data in the form of packets for transmission via the packet-based communications network to a destination node.

The customer premises equipment 108 is interconnected to a switching node 102 via an access module 110. The access module 110 interfaces with the customer premises equipment 108 and performs the following functions: packet segmentation and reassembly, bandwidth admission and enforcement, rate control, congestion recovery, generating alarms for congestion conditions, and generating accounting and statistics records. The switching node 102 also includes a transit module 112 which performs the following functions: routing, signaling, congestion management, and measuring and reporting resource utilization.

An interconnection network 115 interconnects all the modules in a node. All of the nodal components can handle full-duplex communication. For example, an access module can concurrently switch packets from an access line 117 to the interconnection network 115, and vice-versa.

The intermediate nodes 105 include a plurality of transit modules 112 interconnected by an interconnection network 115. Each of the transit modules 105 in an intermediate node 105 interface with a network backbone or trunkline 120 and perform all of the functions identified for the transit modules in the switching nodes 102. The transit modules 112 in the intermediate nodes 105 provide for the interconnection of the network trunklines 120 via the interconnection networks 115 of the nodes 105.

Each virtual connection establishes a communications link between one of the network source nodes 102a and a corresponding network destination node 102b via intermediate nodes 105. An example of a virtual connection in FIG. 1 is the connection between source node A and destination node D via intermediate nodes B and C. Another virtual connection shown in FIG. 1 is the virtual connection between source node A' and destination node D' via intermediate nodes B and C. Although all of the virtual connections illustrated in FIG. 1 utilized intermediate nodes 105, it will be understood by those skilled in the art that a virtual connection may be established directly between a source node 102a and a destination node 102b in accordance with the present invention.

As described hereinabove, all of the nodal components within the communications network 100 can handle full-duplex communications, and therefore, a switching node may be a source node in one virtual connection and a destination node in another virtual connection. For example, in FIG. 1, a virtual connection may be established between a source node A" and destination node A' via intermediate nodes C and B.

Figure 2:
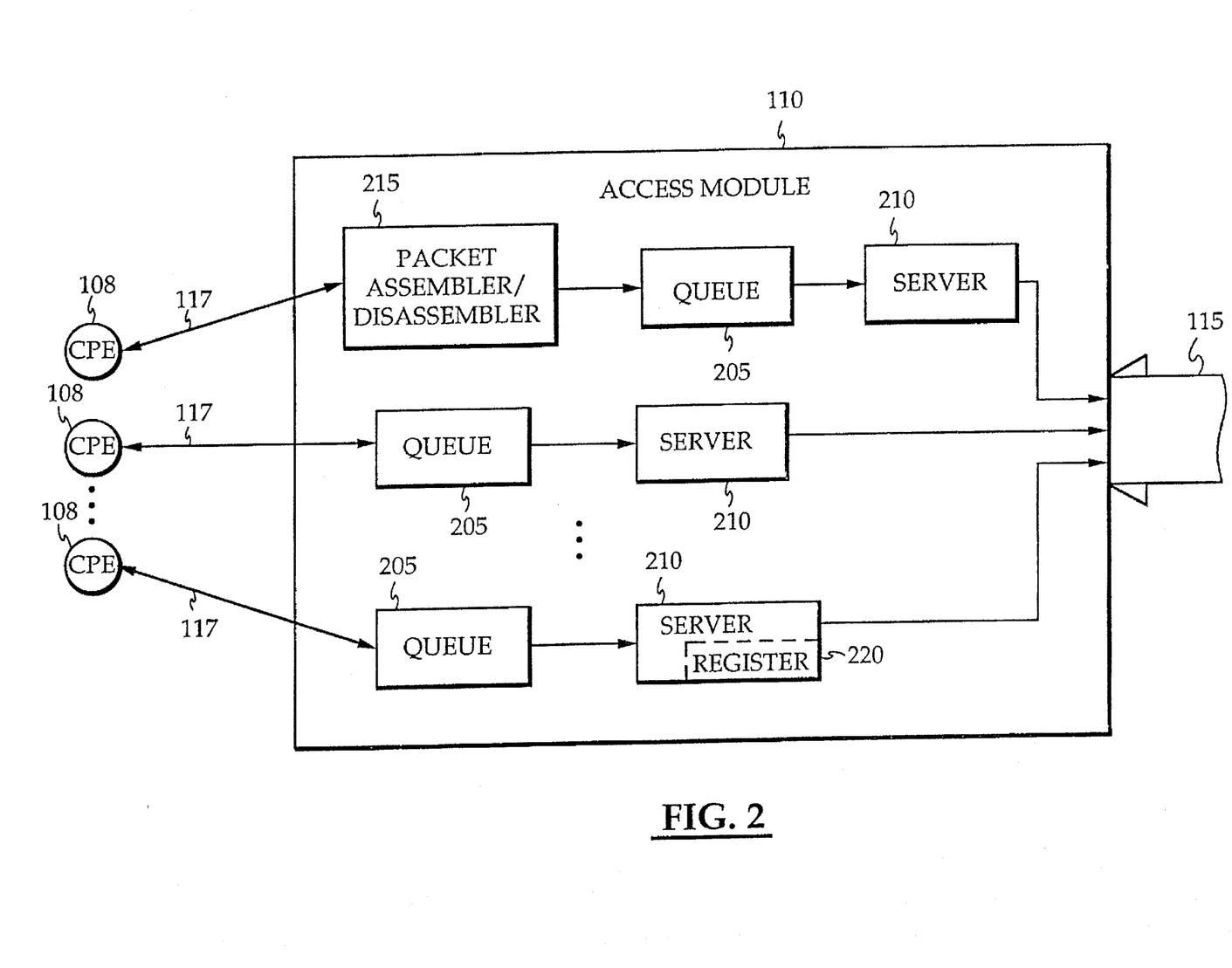
FIG. 2 is a schematic block diagram of an access module contained within a source node or a destination node of the communications network of FIG. 1.

During communications over a virtual connection, data generated by customer premises equipment 108 is provided via the access lines 117 to an access module 110 within a source node 102a. The data may be formatted in the appropriate packet format by the customer premises equipment 108, or alternatively, the access module 110 may include a known packet assembler/disassembler (PAD) for properly formatting data provided by the customer premises equipment 108 for provision to the communications network 100. FIG. 2 is a high level block diagram showing certain basic features of an access module 110 in a source node 102a. Referring to FIG. 2, the customer premises equipment 108 provides data to the access modules 110 on access lines 117. At least one dedicated virtual connection is established for each of the customer premises equipment 108 connected to the access module 110. Each of the virtual connections includes a queue 205, wherein packets provided by the customer premises equipment are initially stored, and a server 210, which controls the provision of the packets from the queue to the transit module 112. As described above, if the information or data provided by the customer premises equipment is not in proper packet format for provision to the communications network, a packet assembler/disassembler 215 may be provided for formatting the data provided by the customer premises equipment 108 into the appropriate packet format. The various queues and servers associated with each of the virtual connections may be implemented by a central processing unit (CPU) which, as is known in the art, includes appropriate processing and memory equipment for carrying out the functions described above and hereinafter with respect to the access module 110.

Figure 3:
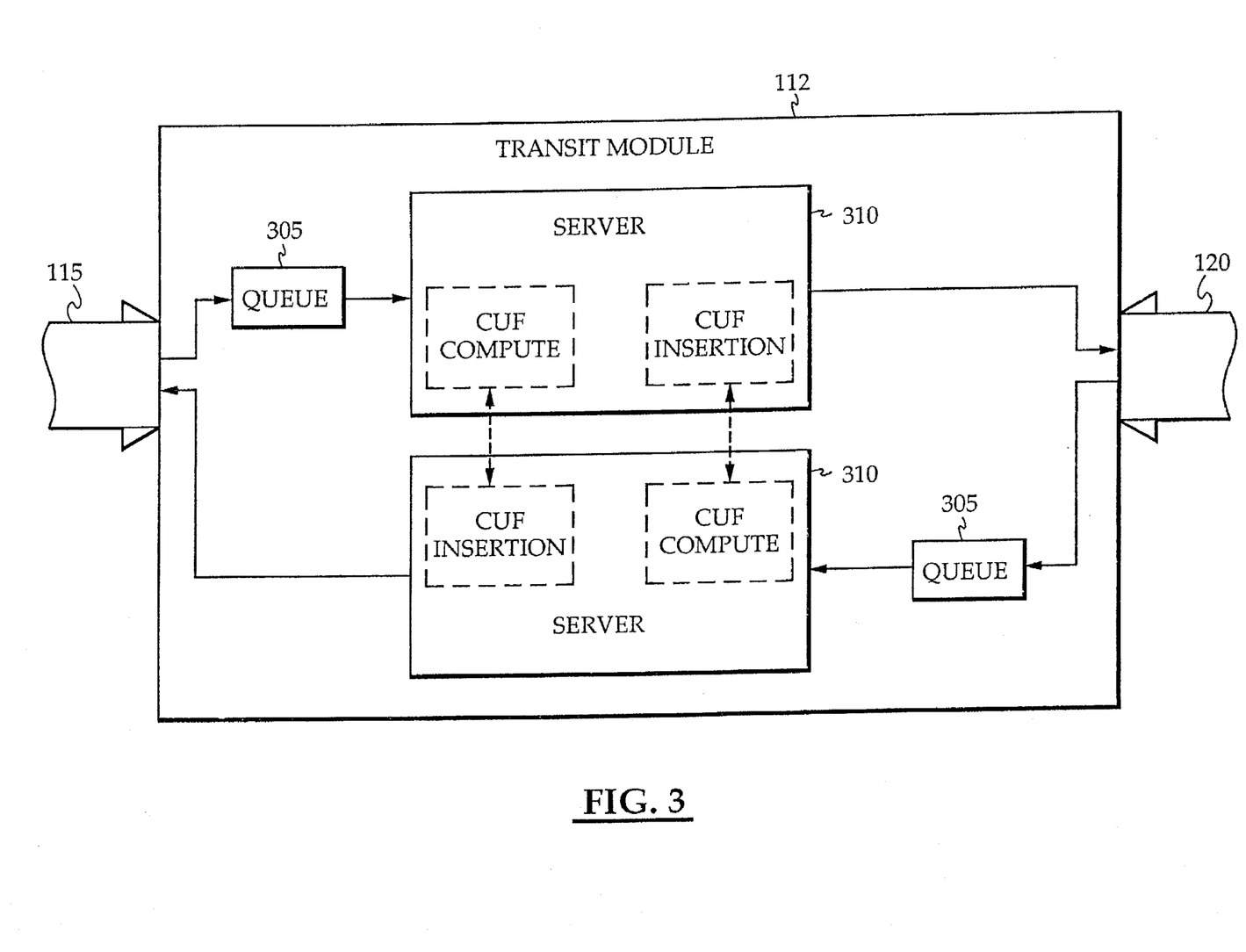
FIG. 3 is a schematic block diagram of a transit module contained within a node of the communications network of FIG. 1.

Referring now to FIGS. 1 and 3, within the source node 102a, the intermediate nodes 105, and the destination node 102b, the packets associated with each virtual connection are provided to and from the interconnection networks 115 by a transit module 112. Each transit module 112 is arranged for full-duplex communication between the interconnection network 115 and a network trunkline 120. In each direction within the transit module 112, a queue 305 is provided for receiving incoming packets from the interconnection network 115 or the network trunkline 120, and a server 310 is provided for retrieving packets from the queue 305 and providing the packets to the network trunkline 120 or interconnection network 115, respectively.

In accordance with the present invention, when a virtual connection is established between a source node 102a and a destination node 102b, and possibly including one or more intermediate nodes 105, packets initially flow along the virtual connection in a forward direction, i.e., from the source node 102a to the destination node 102b. Within each node, the server 310 associated with the forward direction of the virtual connection takes a measurement of a channel utilization factor (CUF), which is a measure of the utilization of critical resources, e.g., bandwidth, processing power, etc., during transmission of packets in a forward direction of the virtual connection. This utilization information is piggy-backed onto packets flowing in the backward (return) direction of the virtual connection by the server 310 associated with the return direction of the virtual path. In the absence of return traffic, the destination node generates a special empty packet so that the utilization information may be provided to the source node.

As described in greater detail hereinafter, the CUF information contained in the return packet traffic of a virtual connection is updated during transmission such that when the return traffic reaches the source node, the CUF information contained in the return traffic is indicative of the maximum degree of utilization indicated by any of the resources within the virtual connection. The CUF information provided in accordance with the present invention is provided to the source node in the most timely and efficient manner. The CUF information associated with the resource utilization experienced by a packet traveling in the forward direction does not travel with that packet all the way to the destination node. Instead, the current CUF information associated with a particular node is piggy-backed directly onto packets flowing in the return direction to the source node. As will be understood by those skilled in the art, in a virtual connection, the first node (access node) encountered by packets traveling in the forward direction is typically the critical and potentially most limiting node (with respect to resource utilization) encountered by the packets in the virtual connection. The CUF information related to the first node in the forward direction is the most timely information provided to the source node during packet transmission by the source node onto the virtual connection.

If the CUF indicates that the resources on the virtual connection are under-utilized, the source node instructs the virtual connection server 210 to increase its packet submission rate into the network. However, if the CUF indicates that the resources on the virtual connection are over-utilized, the source node instructs the virtual connection server 210 to reduce its packet submission rate into the network. The period of time between two consecutive rate adjustments is selected to allow the first adjustment to take effect throughout the network before the occurrence of the second adjustment. This time is selected to be equal to at least one network round-trip delay (RTD). A network round-trip delay is indicative of the time it takes for a packet transmitted from the source node to reach the destination node and return to the source node, via the virtual connection. In a lightly loaded network, a typical RTD is approximately 80 to 100 milliseconds, and in a loaded network, a typical RTD is approximately 200 to 250 milliseconds. These times are used for example only and will vary based on the number of nodes, network connections, etc.

The access modules 110 in the source node 102a controls the rate that packets are submitted to the network on a per virtual connection basis. As described hereinabove, each virtual connection has a separate queue 205 and server 210, with the packet submission rate by the server 210 being updated as a function of network feedback. The rate at which packets are submitted to the network by a server 210 for a given virtual connection is referred to as the submission information rate (SIR). SIR is updated as often as possible, but no faster than the network round-trip delay, except in extreme network congestion cases as described in greater detail hereinafter.

Figure 4:
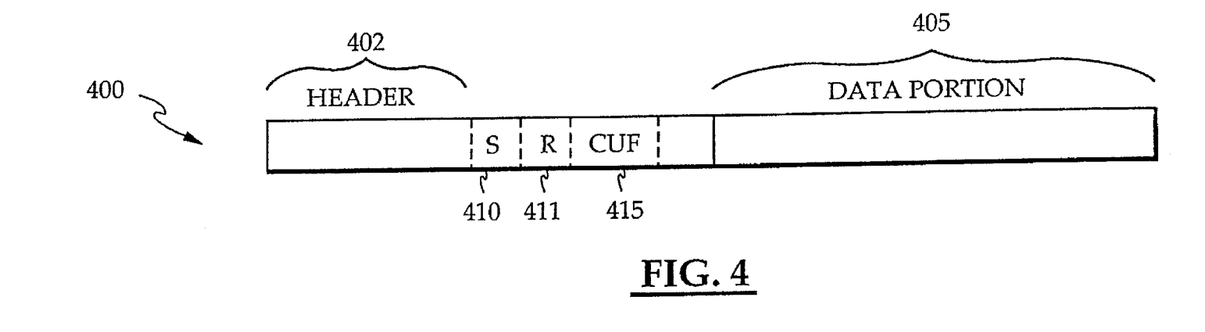
FIG. 4 is a diagram showing a packet having a header portion and a data portion.

Referring to FIGS. 2 and 4, each packet 400 has a header portion 402 and a data portion 405. The header portion contains various required network information such a routing, signaling, parity or error checking, and various other information known to those skilled in the art. The data portion 405 contains the data (information) to be transmitted from the source node 102a to the destination node 102b. For measurement of the RTD along each virtual connection, each packet header portion 402 contains a send flag (S) 410 and a receive flag (R) 411. A group of packets submitted to the network may be in the form of a burst of packets, or the group may be a lengthy stream of packets. When the source node access module 110 updates SIR, it changes the value of the send flag 410, and places the new value of the send flag 410 into the header 402 of all packets 400 within the group being transmitted in the forward direction. Additionally, the server 210 records the time that the first packet in the group of packets was transmitted onto the virtual connection. The time may be recorded in a memory register 220 of the server 210, for example. The server 210 in the destination node access module 110 reads the send flag 410 of all received packets 400 for a given virtual connection and places it into the receive flag of all packets transmitted in the return direction. The source node access module 110 waits until it detects that the receive flag 411 of packets received from the network for the given virtual connection is equal to the send flag 410 of packets corresponding to the time stored in the memory register 220. At this point, the module is assured that at least one round-trip period has elapsed since the last SIR update. RTD is measured as the time difference between the beginning of transmission of the group, i.e., the time stored in the memory register 220, and the time of receipt of the first return packet in the group.

Figure 5:
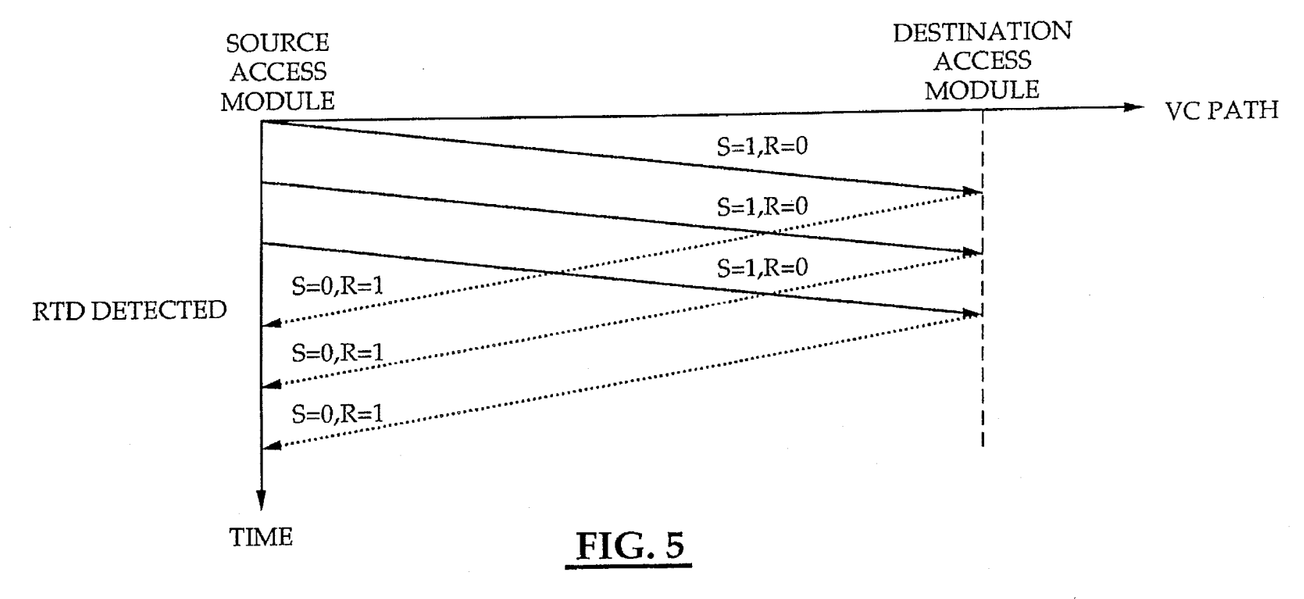
FIG. 5 is a graph depicting the measurement of one network round-trip delay (RTD) of a packet in the communications network.

The measurement of round-trip delay is best understood by example. Referring to FIGS. 4 and 5, assume that a group of packets 400 provided by the source node access module 110 (FIG. 1) contains a send flag 410 equal to 1 (S=1) and a receive flag 411 equal to 0 (R=0). Therefore, each packet 400 within the group has a S bit equal to 1 and an R bit equal to 0. When the first packet 400 within the group reaches the destination node access module 110 (FIG. 1), the value of the send flag 410 in each packet is read by the server 210 (FIG. 2) and placed into the receive flag 411 such that the receive flag of each packet is set equal to 1 (R=1). Once the source node access module 110 (FIG. 1) detects that the receive flag 411 of packets received is equal to the send flag 410 stored within the module, a round-trip delay is detected and a round-trip delay time is determined as the time difference between the transmit time and the time that the return packet is received by the module.

The measured RTD reflects the current network load (or delay) along the given virtual connection. Thus, SIR updates occur more frequently under low network load conditions. A high frequency of SIR updates accelerates the frequency of end-to-end throughput increases for all active virtual connections. Under high network load conditions, however, SIR updates occur less frequently, thereby allowing the rate adjustments to propagate and take full effect throughout the network. This feature is particularly beneficial for virtual connections which transmit bursty traffic. Bursty traffic creates short-lived, high network load when placed on the virtual connection, and the bursty traffic is likely to go off-line shortly thereafter. Less frequent SIR updates in this case allow the network to immediately transfer a large portion of the burst of traffic via the virtual connection before the virtual connections' SIR is throttled, as described hereinafter.

Referring to FIG. 1, the source node access module 110 of a virtual connection adjusts SIR as a function of the CUF received from the network. SIR is always greater than or equal to a committed information rate (CIR), and less than or equal to an excess information rate (EIR). CIR may be determined based on user subscription. For example, a user may subscribe to a CIR of 64 KBits/sec, or multiples thereof up to 512 KBits/sec, for example. EIR may depend on the type of access line used. For example, in the case of a T1 access line, EIR=1.536 MBits/sec. The value of SIR when customer premises equipment begins to provide packets for transmission via a virtual connection, or after a long period of virtual connection inactivity, is set equal to an initial submission rate (ISR). The relationship between CIR, ISR, and EIR is given below:

$$0 \leq CIR \leq ISR \leq EIR$$

ISR is a very important parameter, especially for bursty traffic. ISR is determined per virtual connection, and its setting directly impacts the overall virtual connection delay performance. If ISR is set closer to CIR, then the initial burst that a virtual connection submits into a network after a period of inactivity tends to incur higher delay. This delay can be reduced significantly as ISR approaches EIR. However, a larger ISR setting raises the possibility of short-term congestion at convergence points in the network. This type of congestion may be alleviated by the combination of congestion management and end-to-end rate control. ISR also has significant impact on the overall fairness of the rate control mechanism, as discussed hereinafter.

Figure 6:
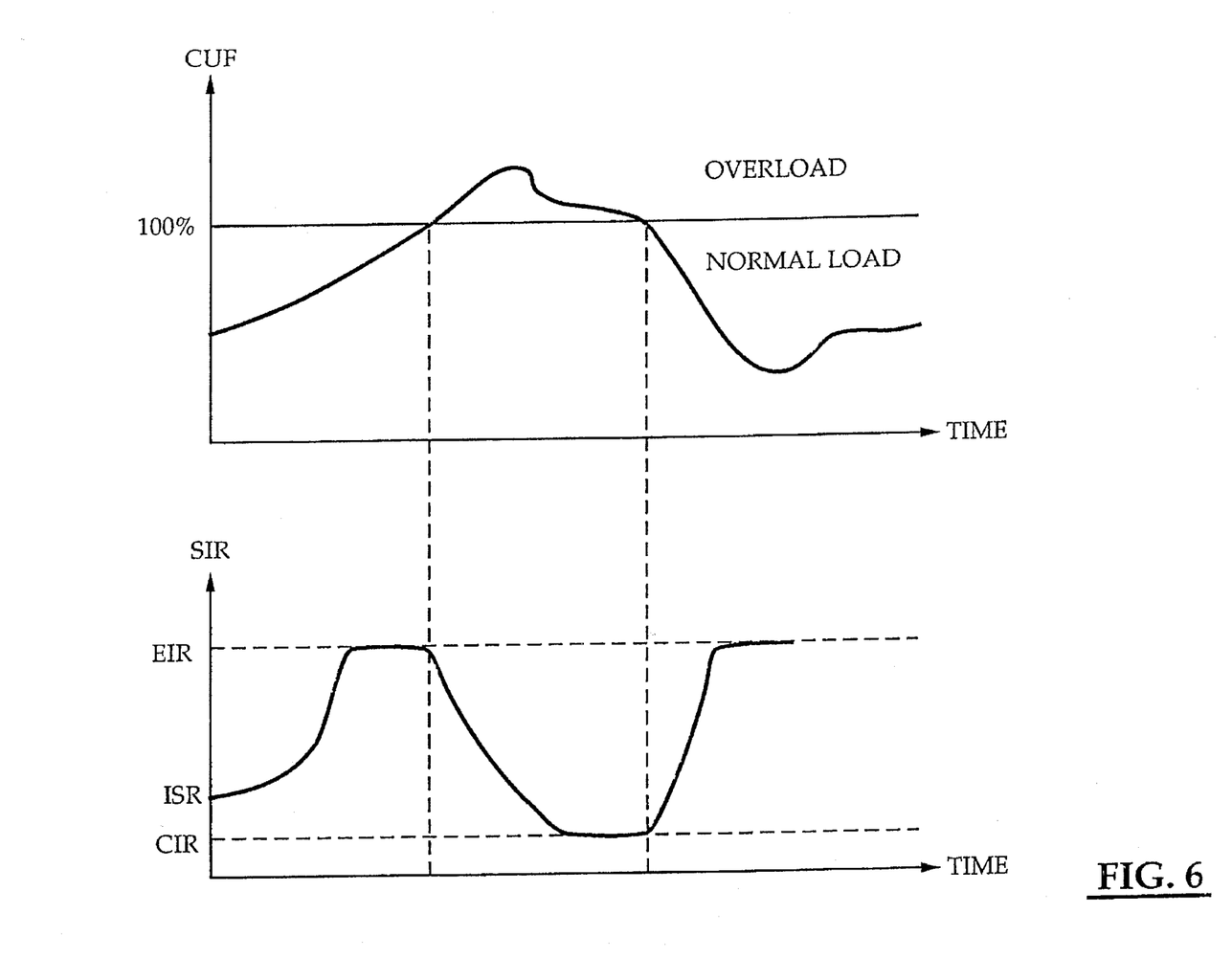
FIG. 6 is a graph illustrating the relationship between rate control and channel utilization factor (CUF).

During operation of a virtual connection, the source node access module 110 detects a round-trip period, and the module then attempts to match SIR to the available network resources along the virtual connection. Rate matching is accomplished by increasing or decreasing SIR by a multiplicative factor, which is a function of the previous SIR, and the current CUF, CIR and EIR. If the current CUF indicates that the resources on the virtual connection are underutilized, e.g., CUF is less than 100%, the access module increases SIR. If the current value of CUF indicates that the resources on the virtual connection are over-utilized, e.g., CUF is greater than or equal to 100%, the access module decreases SIR. The general behavior of SIR as a function of CUF is illustrated in FIG. 6.

After a long period of inactivity, the rate matching mechanism is governed by the following relationship for an idle virtual connection:

SIR=ISR

For an active virtual connection, SIR is given by the following relationship:

$$SIR_{i+1} = \text{MIN}\left[\text{MAX}\left[\frac{SIR_i}{CUF}(\alpha - FF_i), CIR\right], EIR, (SIR_i \times \beta)\right]$$

Wherein $FF_i$ is a fairness factor, and $\alpha$ and $\beta$ are constants selected to optimize network performance for specific traffic types. Typical values for $\alpha$ are between 0.95 and 1.0, and typical values for $\beta$ are between 4.0 and 6.0. These values are provided for example only, and it will be understood by those skilled in the art that these values will vary based on the particular implementation of the invention.

SIR control is subject to the fairness factor (FF) to allocate resources fairly for all virtual connections, and to achieve quick SIR convergence during transient periods. FF is a measure of how close a virtual connections' SIR is to EIR, such that FF is maximum when SIR=EIR and minimum when SIR=CIR, as given below:

$$FF_i = \left[ \frac{SIR_i - CIR}{EIR - CIR} \right] \times \gamma$$

The parameter γ is also selected to optimize network performance for specific traffic types. Typical values for γ are in the rage from 0 to 0.1.

FF has three main effects on SIR. First, when a virtual connection becomes active, the combination of FF and ISR for the newly active virtual connection forces other active virtual connections to quickly reduce their use of excess resources in favor of the newly-active virtual connection. This allows a quick and fair allocation of resources among active virtual connections. Second, when a rate reduction is necessary, virtual connections with higher use of excess resources incur higher rate reduction compared to virtual connections with lesser use of excess resources. Third, when the network utilization changes, FF leads to a quick SIR stabilization for all active virtual connections.

CUF is the key factor of the traffic management system. It is the ratio of the demand for network resources to the total available resources. CUF is measured over a period of time, referred to as the congestion monitoring period (CMP). CMP is sufficiently long enough to allow an accurate statistical measurement of CUF, while at the same time, it is sufficiently short enough to allow several CUF measurements per RTD. The network resources being monitored are processor power and trunk bandwidth. The CUF value reported by each node is the maximum of both processor utilization and trunk utilization.

During a CMP, each transit module accumulates the total number of offered packets (both ingress and egress) for a given processor and the total number of offered bytes (egress only) for a given trunk. At the end of a CMP, the processor utilization is calculated as the ratio of the total number of offered packets to the maximum switching capacity of the processor. The trunk utilization is calculated as the ratio of the total number of offered bytes to the maximum bandwidth capacity of the trunk. Since CUF is a ratio of offered load to available capacity, CUF can be greater than 1.

Referring to FIG. 4, CUF is encoded and placed in a CUF field 415 of the packet header 402. The CUF field 415, for example, may represent values ranging from 1% to 1000%. In addition, a special CUF value may be generated in response to extreme network congestion situations. The special CUF value instructs the access module 110 (FIG. 1) of the virtual connection to immediately reduce SIR to CIR. The special CUF may be indicated by a special code placed in the CUF field 415. Alternatively, an additional field may be provided in the header portion 402 for the special code.

Referring again to FIG. 1, the present invention provides a unique approach to communicating CUF values from network 100 to the source node 102a. Assume a virtual connection is established from source node A to destination node D via intermediate nodes B and C as illustrated in FIG. 1. As packets flow from nodes A to D, all transit modules 112 along the virtual connection measure processor utilization and trunk utilization. At the end of every CMP, each transit module inserts its measured CUF into all packets flowing from nodes D to A only if the measured CUF is greater than the CUF stored in the packet. Therefore, packets that reach node A contain the maximum CUF encountered along the virtual connections' forward path. The source node access module 110 uses this information to adjust the virtual connections' SIR accordingly.

As described hereinabove, the present invention does not communicate network utilization information to the destination node, which in turn echoes the same information back to the source node. This approach could cause the network utilization information to incur a full network round-trip delay before it reaches the source node. Instead, the present invention communicates utilization information directly to the source node, thereby allowing the utilization information to reach the source node quickly, with the worst-case delay being one half network round-trip delay.

Furthermore, the CUF communication mechanism of the present invention provides quick feedback, especially concerning the resource utilization of the most critical node in the network, typically the access node. The interconnection network of modules within a node provides a high bandwidth medium which is generally not a bottleneck in inter-module communication. Hence, the access modules in node A have relatively unlimited access to the transit module. If the CPE traffic is bursty, the transit module might become temporarily congested, hence critically impacting the network delay performance. Therefore, the access modules in node A require quick network feedback to adjust their SIRs in a timely fashion. The present invention allows node A to react quickly to internal congestion because the CUF field in backward packets gets immediately updated by the transit module in the same node. In contrast, a rate control system that sends the congestion information from node A to node D and then back to node A, would have the slowest reaction to congestion in the source node.

In addition to end-to-end rate control as described above, the present invention provides for queuing of packets during periods of network overload. Queuing in access modules 110 is done on a per virtual connection basis. The server 210 for each virtual connection queue 205 operates at a rate equal to the corresponding SIR. Queuing in transit modules is done on a per trunk basis. Hence, all virtual connections established on a given trunk are queued in a single queue. The server for this queue operates at the trunk rate.

In order to contain the end-to-end network delay and to detect incipient congestion, the occupancy of each queue is continuously monitored and compared to a set of queue thresholds or congestion levels. For example, a transit module may monitor 9 congestion levels where level 0 corresponds to "no congestion" and level 8 corresponds to "extreme congestion." Intermediate congestion levels are communicated to the source node access modules 110 using the CUF mechanism described above. This causes the access modules to reduce their SIR appropriately to avoid congestion. If higher levels of congestion occur, the affected transit module might use the special CUF option to force all involved virtual connections to reduce their SIR to CIR. If all these congestion avoidance measures fail to prevent the network from reaching an extreme congestion situation, the network might be forced to selectively discard packets from the affected queues as a congestion recovery measure as described hereinafter.

In addition to using SIR for controlling the rate at which packets are admitted to the network as described hereinabove, a network access module 110 in a source node 102a may be responsible for admitting traffic to the network (bandwidth admission) according to assigned service subscription parameters. The service subscription parameters are associated with three categories of service including: committed, statistically committed, and excess. The access module 110 uses a credit allocation scheme, based on the designated or assigned category of service, to enforce bandwidth admission rules for admitting traffic to the network. The committed category of service (committed credits) correspond to the minimum guaranteed bandwidth that is allocated for a given virtual connection. The statistically committed category of service (statistically committed credits) correspond to bandwidth that is statistically allocated for a given virtual connection. The excess category of service (excess credits) correspond to any available bandwidth over and above committed and statistically committed bandwidth.

Credit usage per virtual connection is measured over an interval of time, T, called a measurement interval. Each virtual connection is allocated a certain number of credits, e.g., committed credits, statistically committed credits and excess credits, to be used during each measurement interval.

As packets arrive at an access module 110 from customer premises equipment 108, the access module 110 performs bandwidth admission and enforcement every measurement interval T. The access module utilizes committed credits first, and marks the associated packets transmitted to the network with the committed credits as being committed packets. If the committed credits have been exhausted, the access module 110 utilizes the statistically committed credits, and marks the packets accordingly as statistically committed packets. Finally, if the statistically committed credits have also been exhausted, the access module 110 utilizes the excess credits, and marks the associated packets as being excess packets. Once all credits have been exhausted during a measurement interval, packets are discarded. Credits are refreshed at the beginning of every measurement interval T. These admission rules ensure that the network is not flooded with traffic that violates the service subscription parameters associated with a give virtual connection.

The marking of packets allows the transit modules to selectively discard packets under extreme network congestion situations. For example, under extreme congestion situations, the transit modules will first discard excess packets. If the congestion persists, statistically committed packets are discarded. Finally, under very severe congestions situations, committed packets are discarded. It will be understood by those skilled in the art that a congestion situation involving the discarding of committed packets is highly unlikely.

Although the invention is described as having three different service subscription parameters for bandwidth admission, it will be understood by those skilled in the art that additional service subscription parameters may be defined for a given network application.

The present invention may be utilized in a network having multiple classes of service. There are three network aspects that define a class of service:

1) bandwidth admission and enforcement at the network access point;

2) trunk queue and service discipline; and

3) CUF measurement and its application to SIR control.

An access module 110 might implement a different criteria of bandwidth admission, bandwidth enforcement, and SIR control depending on the assigned class of service. For example, for a virtual connection associated with a high priority communications channel, a large number of committed credits may be assigned to ensure bandwidth admission. Additionally, $\alpha$, $\beta$, and $\gamma$ are selected to ensure that SIR is responsive for communications of packets onto the network.

In one embodiment of the invention, each class of service might correspond to a different queue in the transit modules. In this case, a transit module 112 measures network resource utilization per queue, e.g., per virtual connection, and generates a CUF that applies to all virtual connections of the same class of service. Alternatively, one queue may be provided for all classes of service. It will therefore be understood that, depending on how transit queues are served, the CUF measurement for a given class of service might also depend on the resource utilization of other classes of service that share the same trunk.

Although the invention has been described and illustrated with respect to exemplary embodiments thereof, it should be understood by those skilled in the art that the foregoing, and various other additions and omissions may be made therein and thereto without departing from the spirit and scope of the present invention.

We claim:

1. A system for traffic management and congestion control on a virtual connection of a packet-based communications network, comprising:

customer premises equipment for providing packets for transmission on the virtual connection, and for receiving packets transmitted on the virtual connection;

a source node for accepting packets from corresponding source node customer premises equipment, and for transmitting the packets over the virtual connection through the packet-based communications network at a variable submission information rate (SIR);

a destination node for accepting the packets transmitted in a forward direction over the virtual connection from said source node to said destination node, for providing the packets transmitted in the forward direction to corresponding destination node customer premises equipment connected thereto, and for transmitting return packets in a return direction over the virtual connection from said destination node to said source node; and means for measuring a channel utilization factor (CUF), which is directly related to the degree of utilization of network resources, during transmission of packets in said forward direction, and for inserting said channel utilization factor in return packets travelling in said return direction;

wherein said source node comprises means for controlling said submission information rate in response to said channel utilization factor contained in said return packets.

2. A system according to claim 1, further comprising:

at least one intermediate node between said source node and said destination node in the virtual connection; and wherein the channel utilization factor is measured at each node in the virtual connection; and wherein the channel utilization factor measured at a node is inserted into a return packet only if its magnitude is greater than the magnitude of the channel utilization factor previously inserted into the return packet.

3. A system according to claim 2, wherein said source node and said destination node comprise:

at least one access module for interconnection with an access line connected to customer premises equipment, said access line providing a transmission path for packets between said access module and said customer premises equipment;

at least one transit module for interconnection with a network trunk line; and an interconnection network for interconnecting said access modules and said transit modules.

4. A system according to claim 3, wherein each intermediate node comprises:

at least two transit modules, each for interconnection with a network trunk line; and an interconnection network for interconnecting said transit modules.

5. A system according to claim 4, wherein said access modules comprise:

at least one queue for queuing packets received from customer premises equipment for transmission on the virtual connection, and for queuing packets received from the virtual connection for provision to customer premises equipment, wherein at least one queue is provided for each customer premises equipment interconnected to said access module; and at least one server, responsive to said channel utilization factor contained in said return packets, for transmitting packets from said queue onto the virtual connection at said submission information rate, and for providing said return packets to said queue, at least one server being provided for each queue.

6. A system according to claim 5, wherein said transit modules comprise:

an interconnection network queue for queuing packets received from the interconnection network;

a trunk line queue for queuing packets received from the trunk line;

an interconnection network server for transmitting packets from said interconnection network queue to the trunkline; and a trunkline server for transmitting packets from said trunkline queue to the interconnection network.

7. A system according to claim 6, wherein said interconnection network server measures channel utilization factor as the greater of server utilization and trunkline utilization, wherein server utilization is the ratio of the total number of packets provided to said interconnection network queue or said trunkline queue to the maximum switching capacity of said interconnection network server or said trunkline server, respectively, and wherein trunkline utilization is the ratio of the total number of packets provided to the trunkline by said interconnection network server to the maximum bandwidth capacity of the trunkline.

8. A system according to claim 7, wherein said access module server updates the submission information rate once during each round-trip delay (RTD), wherein round-trip delay is the time it takes for a packet transmitted from the source node to reach the destination node and return to the source node over the virtual connection.

9. A system according to claim 8, wherein channel utilization factor is measured during a congestion monitoring period (CMP), and wherein said congestion monitoring period is sufficiently long enough to allow an accurate statistical measurement of the channel utilization factor and is sufficiently short enough to allow several measurements of channel utilization factor per round-trip delay.

10. A system according to claim 9, wherein:

submission information rate is always greater than or equal to a committed information rate (CIR);

submission information rate is always less than or equal to an excess information rate (EIR); and submission information rate is initially set equal to an initial submission rate (ISR), wherein the relationship between said committed information rate, said excess information rate, and said initial submission rate is given by:

$CIR \leq ISR \leq EIR$.

11. A system according to claim 10, wherein after each round-trip delay, a new submission information rate ($SIR_{i+1}$) is determined based on the current submission information rate ($SIR_i$), said channel utilization factor, said committed information rate and said excess information rate, as given by the following relationship:

$$SIR_{i+1} = MIN\left[ MAX\left[ \frac{SIR_i}{CUF}(\alpha - FF_i), CIR \right], EIR, (SIR_i \times \beta) \right]$$

wherein $FF_i$ is a fairness factor, and $\alpha$ and $\beta$ are constants selected to optimize performance of the communications network.

12. A system according to claim 11, wherein said fairness factor is given by the following relationship:

$$FF_i = \left[ \frac{SIR_i - CIR}{EIR - CIR} \right] \times \gamma$$

wherein $\gamma$ is a constant selected to optimize performance of the communications network.

13. A system according to claim 12, wherein multiple classes of service are defined for the communications network, and wherein the magnitudes of said constants $\alpha$, $\beta$ and $\gamma$ are selected based on the class of service.

14. A system according to claim 10, further comprising means for providing a special channel utilization factor in response to extreme network congestion, said source node access modules reducing the submission information rate to the committed information rate in response to said special channel utilization factor.

15. A system according to claim 1, further comprising bandwidth admission means for admitting packets to the virtual connection according to assigned service subscription parameters.

16. A system according to claim 15, wherein said assigned service subscription parameters comprise:

committed credits corresponding to a minimum guaranteed bandwidth that is allocated on the communications network for the virtual connection;

statistically committed credits corresponding to bandwidth that is statistically allocated on the communications network for the virtual connection; and excess credits corresponding to any available bandwidth of the communications network that is greater than the statistically allocated and minimum guaranteed bandwidth.

17. A system according to claim 16, wherein said assigned service subscription parameters are allocated to the virtual connection on a per measurement interval basis, wherein the number of committed credits, statistically committed credits and excess credits allocated to the virtual connection are updated at the end of each measurement interval, and wherein during a measurement interval, said source node first provides a number of packets to the virtual connection corresponding to the number of committed credits, and marks such packets as committed packets;

said source node next provides a number of packets to the virtual connection corresponding to the number of statistically committed credits, and marks such packets as statistically committed packets;

said source node next provides a number of packets to the virtual connection corresponding to the number of excess credits, and marks such packets as excess packets; and said source node discards any remaining packets.

18. A system according to claim 17, wherein during transmission on the virtual connection, packets are selectively discarded under certain network congestion situations according to a predefined protocol wherein excess packets are discarded first, statistically committed packets are discarded second, and committed packets are discarded last.

19. A system according to claim 1, wherein said source node and said destination node each comprise:

at least one access module for interconnection with an access line connected to customer premises equipment, said access line providing a transmission path for packets between said access module and said customer premises equipment;

at least one transit module for interconnection with a network trunk line; and an interconnection network for interconnecting said access modules and said transit modules.

20. A system according to claim 19, wherein the channel utilization factor is measured at each transit module in the virtual connection, and wherein the channel utilization factor measured at a transit module is inserted into a return packet only if its magnitude is greater than the magnitude of the channel utilization factor previously inserted into the return packet.

21. A system according to claim 20, wherein said access modules comprise:

at least one queue for queuing packets received from customer premises equipment for transmission on the virtual connection, and for queuing packets received from the virtual connection for provision to customer premises equipment, wherein at least one queue is provided for each customer premises equipment interconnected to said access module; and at least one server, responsive to said channel utilization factor contained in said return packets, for transmitting packets from said queue onto the virtual connection at said submission information rate, and for providing said return packets to said queue, at least one server being provided for each queue.

22. A system according to claim 21, wherein said transit modules comprise:

an interconnection network queue for queuing packets received from the interconnection network;

a trunk line queue for queuing packets received from the trunk line;

an interconnection network server for transmitting packets from said interconnection network queue to the trunkline; and a trunkline server for transmitting packets from said trunkline queue to the interconnection network.

23. A system according to claim 22, wherein said interconnection network server measures channel utilization factor as the greater of server utilization and trunkline utilization, wherein server utilization is the ratio of the total number of packets provided to said interconnection network queue or said trunkline queue to the maximum switching capacity of said interconnection network server or said trunkline server, respectively, and wherein trunkline utilization is the ratio of the total number of packets provided to the trunkline by said interconnection network server to the maximum bandwidth capacity of the trunkline.

24. A system according to claim 23, wherein said access module server updates the submission information rate once during each round-trip delay (RTD), wherein round-trip delay is the time it takes for a packet transmitted from the source node to reach the destination node and return to the source node over the virtual connection.

25. A system according to claim 24, wherein channel utilization factor is measured during a congestion monitoring period (CMP), and wherein said congestion monitoring period is sufficiently long to allow an accurate statistical measurement of the channel utilization factor and is sufficiently short enough to allow several measurements of channel utilization factor per round-trip delay.

26. A system according to claim 25, wherein:

submission information rate is always greater than or equal to a committed information rate (CIR);

submission information rate is always less than or equal to an excess information rate (EIR); and submission information rate is initially set equal to an initial submission rate (ISR), wherein the relationship between said committed information rate, said excess information rate, and said initial submission rate is given by:

CIR ≤ ISR ≤ EIR.

27. A system according to claim 26, further comprising means for providing a special channel utilization factor in response to extreme network congestion, said source node access modules reducing the submission information rate to the committed information rate in response to said special channel utilization factor.

28. A system according to claim 27, wherein a round-trip delay is determined as the time it takes for a packet to travel from said source node to said destination node and back over the virtual connection, and after each round-trip delay, a new submission information rate ($SIR_{i+1}$) is determined based on the current submission information rate ($SIR_i$), said connection utilization factor, said committed information rate and said excess information rate, as given by the following relationship:

$$SIR_{i+1} = MIN\left[ MAX\left[ \frac{SIR_i}{CUF}(\alpha - FF_i), CIR \right], EIR, (SIR_i \times \beta) \right]$$

wherein $FF_i$ is a fairness factor, and $\alpha$ and $\beta$ are constants selected to optimize performance of the communications network.

29. A system according to claim 28, wherein said fairness factor is given by the following relationship:

$$FF_i = \left[ \frac{SIR_i - CIR}{EIR - CIR} \right] \times \gamma$$

wherein $\gamma$ is a constant selected to optimize performance of the communications network.

30. A system according to claim 28, wherein multiple classes of service are defined for the communications network, and wherein the magnitudes of said constants $\alpha$, $\beta$ and $\gamma$ are selected based on the class of service.

31. A system according to claim 1, wherein:

submission information rate is always greater than or equal to a committed information rate (CIR);

submission information rate is always less than or equal to an excess information rate (EIR); and submission information rate is initially set equal to an initial submission rate (ISR), wherein the relationship between said committed information rate, said excess information rate, and said initial submission rate is given by:

CIR ≤ ISR ≤ EIR.

32. A system according to claim 31, wherein after each round-trip delay, a new submission information rate ($SIR_{i+1}$) is determined based on the current submission information rate ($SIR_i$), said connection utilization factor, said committed information rate and said excess information rate, as given by the following relationship:

$$SIR_{i+1} = \text{MIN}\left[\text{MAX}\left[\frac{SIR_i}{CUF}(\alpha - FF_i), CIR\right], EIR, (SIR_i \times \beta)\right]$$

wherein $FF_i$ is a fairness factor, and $\alpha$ and $\beta$ are constants selected to optimize performance of the communications network.

33. A system according to claim 32, wherein said fairness factor is given by the following relationship:

$$FF_i = \left[\frac{SIR_i - CIR}{EIR - CIR}\right] \times \gamma$$

wherein $\gamma$ is a constant selected to optimize performance of the communications network.

34. A system according to claim 33, further comprising bandwidth admission means for admitting packets to the virtual connection according to assigned service subscription parameters comprising:
committed credits corresponding to a minimum guaranteed bandwidth that is allocated on the communications network for the virtual connection;
statistically committed credits corresponding to bandwidth that is statistically allocated on the communications network for the virtual connection; and
excess credits corresponding to any available bandwidth of the communications network that is over and above the statistically allocated and minimum guaranteed bandwidth.

35. A system according to claim 34, wherein said assigned service subscription parameters are allocated to the virtual connection on a per measurement interval basis, wherein the number of committed credits, statistically committed credits and excess credits allocated to the virtual connection is updated at the end of each measurement interval, and wherein during a measurement interval,
said source node first provides a number of packets to the virtual connection corresponding to the number of committed credits, and marks such packets as committed packets;
said source node next provides a number of packets to the virtual connection corresponding to the number of statistically committed credits, and marks such packets as statistically committed packets;
said source node next provides a number of packets to the virtual connection corresponding to the number of excess credits, and marks such packets as excess packets; and
said source node discards any remaining packets.

36. A system according to claim 35, wherein during transmission on the virtual connection, packets are selectively discarded under certain network congestion situations according to a predefined protocol wherein excess packets are discarded first, statistically committed packets are discarded second, and committed packets are discarded last.

37. A system according to claim 36, wherein multiple classes of service are defined for the communications network, and wherein the magnitudes of said constants $\alpha$, $\beta$ and $\gamma$ are, and the amount of assigned committed credits, statistically committed credits and excess credits are selected based on the class of service.

38. A method for traffic management and congestion control of packets traveling in a forward direction from a source node to a destination node on a virtual connection of a packet-based communications network, the method comprising the steps of:
transmitting the packets from the source node to the destination node on the virtual connection at a variable submission information rate (SIR);
measuring a channel utilization factor (CUF), which is directly related to the degree of utilization of network resources, during transmission of packets in said forward direction;
inserting said channel utilization factor in return packets travelling in a return direction from the destination node to the source node on the virtual connection; and
adjusting said submission information rate in response to said channel utilization factor contained in said return packets.

39. A method according to claim 38, wherein:
submission information rate is always greater than or equal to a committed information rate (CIR);
submission information rate is always less than or equal to an excess information rate (EIR); and
submission information rate is initially set equal to an initial submission rate (ISR), wherein the relationship between said committed information rate, said excess information rate, and said initial submission rate is given by:
$CIR \leq ISR \leq EIR$.

40. A method according to claim 39, further comprising the steps of:
measuring a round-trip delay as the time it take a packet to travel from the source node to the destination node and back over the virtual connection; and
determining a new submission information rate ($SIR_{i+1}$) after each round-trip delay based on the current submission information rate ($SIR_i$), said connection utilization factor, said committed information rate and said excess information rate, as given by the following relationship:

$$SIR_{i+1} = \text{MIN}\left[\text{MAX}\left[\frac{SIR_i}{CUF}(\alpha - FF_i), CIR\right], EIR, (SIR_i \times \beta)\right]$$

wherein $FF_i$ is a fairness factor, and $\alpha$ and $\beta$ are constants selected to optimize performance of the communications network.

41. A method according to claim 40, wherein said fairness factor is given by the following relationship:

$$FF_i = \left[\frac{SIR_i - CIR}{EIR - CIR}\right] \times \gamma$$

wherein $\gamma$ is a constant selected to optimize performance of the communications network.

42. A method according to claim 41, further comprising the step of admitting packets to the virtual connection according to assigned service subscription parameters.

43. A method according to claim 42, wherein said assigned service subscription parameters comprise:
committed credits corresponding to a minimum guaranteed bandwidth that is allocated on the communications network for the virtual connection;
statistically committed credits corresponding to bandwidth that is statistically allocated on the communications network for the virtual connection; and
excess credits corresponding to any available bandwidth of the communications network that is over and above the statistically allocated and minimum guaranteed bandwidth.

44. A system according to claim 43, further comprising the steps of:

allocating said assigned service subscription parameters to the virtual connection on a per measurement interval basis;

updating the number of committed credits, statistically committed credits and excess credits allocated to the virtual connection at the end of each measurement interval, and during a measurement interval:

said source node first provides a number of packets to the virtual connection corresponding to the number of committed credits, and marks such packets as committed packets;

said source node next provides a number of packets to the virtual connection corresponding to the number of statistically committed credits, and marks such packets as statistically committed packets;

said source node next provides a number of packets to the virtual connection corresponding to the number of excess credits, and marks such packets as excess packets; and said source node discards any remaining packets.

45. A method according to claim 44, further comprising the step of selectively discarding packets from a virtual connection under certain network congestion situations according to a predefined protocol wherein excess packets are discarded first, statistically committed packets are discarded second, and committed packets are discarded last.

46. A method according to claim 45, further comprising the step of providing a special channel utilization factor in response to extreme network congestion, said source node access modules reducing the submission information rate to the committed information rate in response to said special channel utilization factor.

* * * * *